United States Patent [19]

Bouchy et al.

[11] 3,962,916

[45] June 15, 1976

[54] SYSTEM FOR THE MEASUREMENT OF A CLOSED AIR SPACE

[75] Inventors: Jean C. Bouchy; Theodore J. Hardman, both of Cincinnati, Ohio

[73] Assignee: McNay Equipment Company, Inc., Cincinnati, Ohio

[22] Filed: Jan. 23, 1974

[21] Appl. No.: 435,667

[52] U.S. Cl. ................................ 73/149; 73/290 B
[51] Int. Cl.² ........................................ G01F 17/00
[58] Field of Search ................... 73/149, 290 B, 37

[56] References Cited
UNITED STATES PATENTS

| 1,885,926 | 11/1932 | Lewis | 73/290 B |
|---|---|---|---|
| 2,113,686 | 4/1938 | Gift | 73/149 X |
| 2,691,304 | 10/1954 | Smith et al. | 73/290 B |
| 2,849,881 | 9/1958 | Anderson | 73/290 B |
| 3,060,735 | 10/1962 | Baker | 73/149 |

FOREIGN PATENTS OR APPLICATIONS

| 152,078 | 9/1962 | U.S.S.R. | 73/149 |
|---|---|---|---|
| 232,536 | 12/1968 | U.S.S.R. | 73/149 |
| 257,057 | 11/1969 | U.S.S.R. | 73/149 |

Primary Examiner—Richard C. Queisser
Assistant Examiner—Joseph W. Roskos
Attorney, Agent, or Firm—Lane, Aitken, Dunner & Ziems

[57] ABSTRACT

In a system for measuring the volume of a closed air space as for example the volume of the air space above the liquid in a container, a regulated gas supply provides a source of predetermined pressure which is used to charge a small vessel of known volume to the same pressure. A fluidic sensing system detects when the pressure in the vessel is equal to the pressure of the regulated supply and then automatically interrupts the connection between the gas supply and the vessel and then connects the vessel to discharge into the volume being measured. The resulting pressure in the volume will be inversely proportional to the volume.

2 Claims, 1 Drawing Figure

U.S. Patent   June 15, 1976   3,962,916
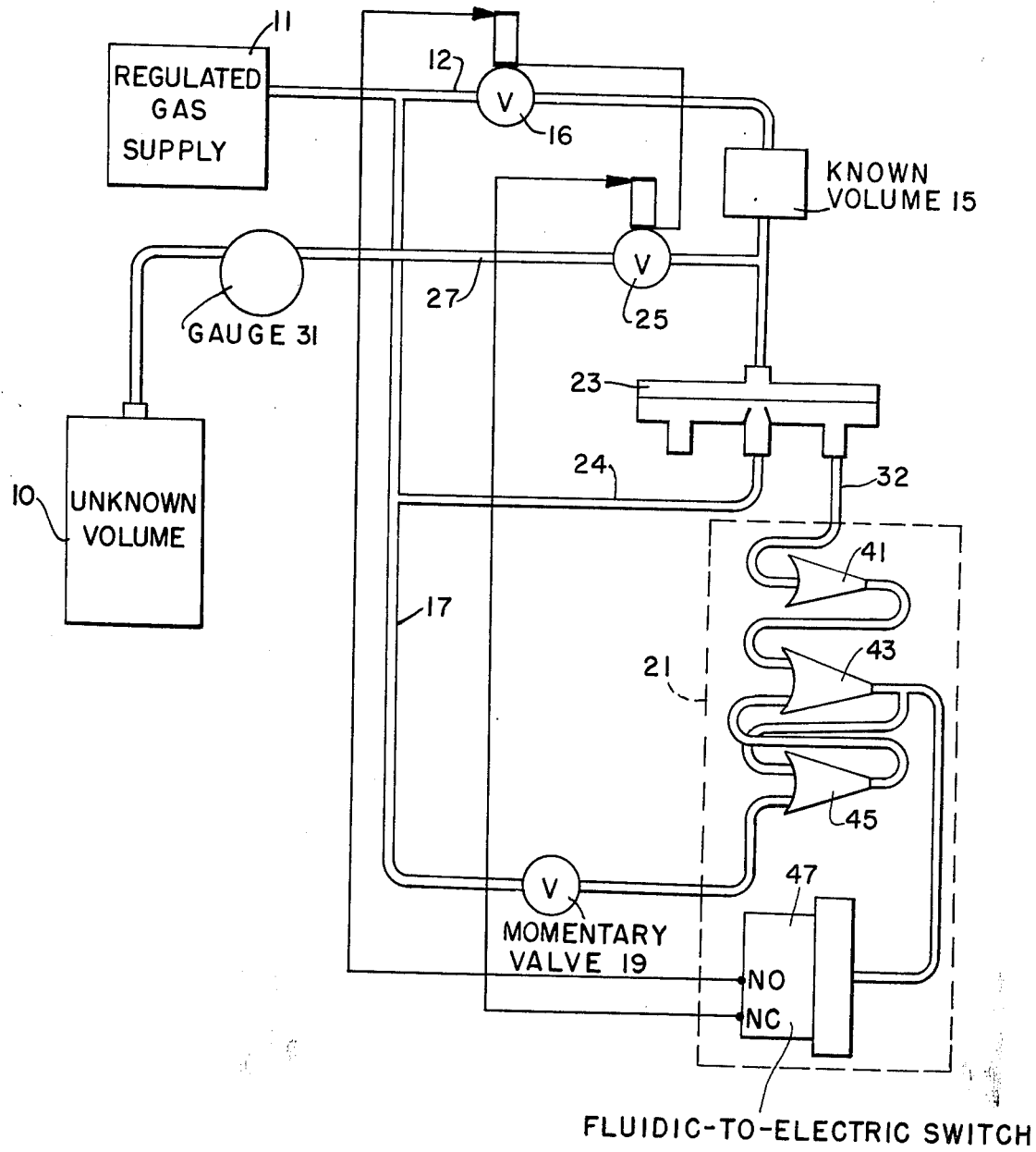

SYSTEM FOR THE MEASUREMENT OF A CLOSED AIR SPACE

BACKGROUND OF THE INVENTION

This invention relates to volume measurement and, more particularly, to an improved pneumatic system for measuring the volume of a closed air space.

In the marketing of beverages in restaurants and bars, it is desirable to be able to quickly determine the inventory stored in containers from which the supply of beverages has been partially depleted. The present invention provides a small, portable, simple pneumatic system for taking such inventory measurements by measuring the volume of air space above the liquid remaining in the vessel containing the partially depleted supply. This measurement is taken by charging a known volume to a known pressure above atmospheric, then exausting the known volume into the unknown air space volume and then measuring the resulting pressure. This technique of measuring an unknown volume was known before the present invention but involved cumbersome manually operated equipment.

SUMMARY AND OBJECTS OF THE INVENTION

In accordance with the present invention, a source of regulated pressure supply is connected to pressurize a vessel with a small known volume. A unique, simple fluidic control system senses when the pressure in the vessel reaches that of the regulated supply and upon the equalization of the pressure, automatically shuts off the connection between the supply in the vessel and at the same time connects the vessel to exhaust into the unknown volume. Because no delay occurs between the pressurizing of the vessel of known volume and the exaustion of the vessel into the unknown volume, no inaccuracy due to leakage from the vessel will occur. As a result, the vessel of known volume may be made very small without sacrificing accuracy. The present invention provides a small, portable device for measuring unknown volume accurately. Moreover, because of the automatic operation, each measurement is taken in a very short time, thus making it practical to take inventory for a large number of containers.

Accordingly, it is an object of the present invention to provide an improved apparatus for measuring volumn which is small, portable and makes the desired measurement accurately in a minimum amount of time.

A further object of the present invention is to provide a volume measuring apparatus with a simple system for controlling automatic operation.

A further object of the present invention is to provide a simplified fluidic control system for automatically operating a volume measurement instrument.

Further objects and advantages of the present invention will become apparent from the drawings of the invention and the following detailed description of the preferred embodiment of the invention.

BRIEF DESCRIPTION OF THE DRAWINGS

The single FIGURE of the drawings is a block diagram illustrating the automatically controlled volume measuring instrument of the present invention.

DESCRIPTION OF A PREFERRED EMBODIMENT

In the measuring system of the invention illustrated in the drawings, the reference number 10 designates the volume to be measured. Before measuring the volume 10, it is opened to atmospheric pressure or otherwise set at atmospheric pressure.

The reference number 11 designates the gas supply of a predetermined known fixed pressure. A pneumatic line 12 is connected between the supply 11 and a vessel 15 of precisely known volume through a solenoid operated valve 16. A pneumatic line 17 also connects the supply 11 to a pneumatically responsive solenoid control unit 21 through a manually actuated valve 19, which is designed for measuring operation. The valve 19, for example, may be merely an opening in the line which can be closed by a finger. When a finger closes the opening, the pressure in the line is transmitted past the opening to the control unit 21.

To initiate the measurement operation, the valve 19 is actuated to momentarily send a pressure pulse to the control unit 21. In response to this pulse, the control unit 21 energizes the solenoid of the valve 16 to open the line 12 whereupon gas flows from the supply 11 into the vessel 15. A pressure differential sensor 23 is pneumatically connected to the vessel 15 and to the gas supply 11 over line 24 and detects when the pressure in the vessel 15 equals that in the gas supply 11. When the pressure in the vessel 15 becomes equal to that in the gas supply 11, the sensor 23 will pneumatically signal the control unit 21. In response to the pneumatic signal, the control unit 21 will de-energize the solenoid of the valve 16 disconnecting the gas supply from the vessel 15 and will then energize the solenoid of a solenoid operated valve 25 in a line 27, which is connected to the vessel 15 at one end and is provided with appropriate fittings at the other end to be connected to the unknown volume 10. When the solenoid of the valve 25 is energized, it opens the line 27 allowing gas to flow from the vessel 15 into the unknown volume 10. A pressure gauge 31 connected to the line 27 indicates the pressure in the line 27 and thus in the unknown volume 10.

The unknown volumn can then be determined as follows. If $V_1$ represents the volume of the vessel 15, $V_2$ represents the volume of the vessel 15 plus the unknown volume being measured, $P_1$ is the predetermined pressure of the supply 11, and $P_2$ is the gauge pressure in the unknown volume 29 after the valve 25 has connected the vessel 15 to the unknown volume and the system has become static or stabilized, then these quantities are related by the following expressions:

$$P_1 V_1 = P_2 V_2 \text{ and}$$

$$V_2 = \frac{P_1 V_1}{P_2}$$

$$V_2 = V_1 + V_u$$

which represents the unknown volume. Accordingly, the following expressions can be derived:

$$V_1 + V_u = \frac{P_1 V_1}{P_2} \text{ and}$$

$$V_u = V_1 \left( \frac{P_1}{P_2} - 1 \right)$$

Since $V_1$ and $P_1$ are fixed quantities, the unknown volume is an inverse function of $P_2$. The pressure gauge 31 indicates $P_2$ and may be callibrated to indicate directly the unknown volume 10.

The pressure differential senser 23 may be of the diaphragm fluidic type such as made by Pitney-Bowes identified by Model No. 6090040. The senser 23 provides a pneumatic connection from the line 24 and thus from the gas supply 11 to the control unit 21 over line 32 for as long as the pressure signal received from the vessel 15 is below that received on line 24 from gas supply 11. When the pressure in the vessel 15 rises to equal that of the gas supply 11, the diaphragm of the senser 23 will shut off the connection between the line 24 and the line 32. Thus the pressure of the regulated supply 11 will be applied to the control unit 21 over line 32 until the pressure in the vessel 15 rises to equal that of the supply 11 whereupon the applied pressure signal in line 32 drops to atmospheric pressure or, in other words, zero gauge pressure.

The control unit 21 comprises three binary fluidic gates 41, 43 and 45. To simplify the description, positive gauge pressure is designated as representing a binary 1 condition and zero gauge or atmospheric pressure is designated as representing a binary 0 condition. The gate 41 is an inverter producing a 1 condition at its output in response to a 0 input condition and producing a 0 output condition in response to a 1 input condition. The gates 43 and 45 are NOR gates each producing a 1 condition at its respective output in response to a 0 condition applied to either of its two inputs and producing a 0 condition at its output in response to a 1 condition at both of its inputs. The gate 41 conveniently may be identical to the gates 43 and 45 but using just one of the inputs thereof.

When the momentary pressure pulse is applied by valve 19 to the gate 45, this gate will produce a 0 condition at its output and this 0 condition will be applied to an input of the gate 43. At this time, the gate 41 will be receiving the pressure of the regulated gas supply 11 over line 32 at its input and, therefore, will produce a 0 condition at its output, which 0 condition is applied to the other input of the gate 43. Thus the gate 43 receives a 0 condition signal at both of its inputs and therefore will produce a 1 condition at its output. The 1 condition at the output of the gate 43 is applied to an input of gate 45 to maintain the output of this gate at the 0 condition. The gates 43 and 45 are thus connected as a flip-flop being set to produce a 1 condition, or in other words, a positive gauge pressure, at the output of the gate 43 in response to the momentary pulse applied through valve 19 and to maintain this pressure at the output of the gate 43 until the flip-flop is reset.

When the pressure in the vessel 15 has risen to that of the regulated gas supply 11 causing the senser 23 to shut off the connection between the lines 24 and 32, the pressure in line 32 drops to 0 causing a 1 condition at the output of the gate 41. This 1 condition at the output at the gate 41 resets the flip-flob by causing the output of the gate 43 to drop to 0, which in turn causes the output of the gate 45 to rise to a 1 condition. As a result, the flip-flop will be maintained in the reset condition, in which the output from the gate 43 is at zero gauge pressure or, in other words, at atmospheric pressure. Thus the flip-flop will be set and the gate 43 will produce a positive output pressure in response to the momentary closure of valve 19 and then will maintain this pressure until the pressure in vessel 15 has risen to equal that of the gas supply 11 whereupon the flip-flop will be reset and the output pressure from the gate 43 will drop to 0 gauge pressure.

The output from the gate 43 is applied to a fluidic-to-electric switch 47 which has normally closed output contacts and normally open output contacts. The normally closed contacts energize the solenoid of the valve 25 when closed and de-energize the solenoid of the valve 25 when open. The normally open contacts energize the solenoid of the valve 16 when closed and de-energize the solenoid of the valve 16 when open. When the output pressure of gate 43 is 0, the contacts of the switch 47 will be in their normal condition so that the solenoid of the valve 16 will be de-energized and the solenoid of the valve 25 will be energized. When the output from the gate 43 is a positive pressure or a binary 1, the normally closed contacts will open and the normally open contacts will close so that the solenoid of the valve 16 becomes energized and the solenoid of the valve 25 becomes de-energized. Thus when the flip-flop is set in response to the momentary pressure pulse from valve 19, the switch 47 will energize the solenoid of valve 16 to connect the gas supply 11 to the vessel 15. At the same time, the switch 47 will de-energize the solenoid of valve 25 so that line 27 is shut off. Then when the fluidic relay is reset in response to the pressure in vessel 15 rising to equal that of regulated gas supply 11, the switch 47 will de-energize the solenoid of valve 16 disconnecting supply 11 from the vessel 15 and will energize the solenoid of valve 25 connecting the vessel 15 to the unknown volume 10. The switch 47 may be of the type manufactured by Pitney-Bowes under Model No. 6080158.

A prototype of the instrument of the present invention is about 6 inch × 6 inch × 4 inch and weighs only about 4 pounds. The portability of the instrument facilitates its use in taking inventory in taverns and restaurants by measuring the volume remaining or removed from a partially filled liquor vessel. The amount of liquid remaining in any vessel can be checked since the device is not dependent upon the specific gravity of the liquid.

The above description is of a preferred embodiment of the invention and many modifications can be made thereto without departing from the spirit and scope of the invention.

We claim:

1. A system for measuring an unknown volume comprising a source of predetermined pressure, a vessel of predetermined volume, first valve means having an open condition and a shut condition and being operable to provide a first fluid connection between said source of predetermined pressure and said vessel in said open condition and to interrupt said first fluid connection in said shut condition, second valve means having an open condition and a shut condition and being operable in said open condition to provide a second fluid connection between said vessel and the unknown volume to be measured and to interrupt said second fluid connection in said shut condition, control means for initially setting said first valve means in an open condition and said second valve means in its shut condition and being responsive to the pressure in said vessel and to the said predetermined pressure to switch said said first valve means to its shut condition and switch said second valve means to its open condition in response to the pressure in said vessel becoming equal to said predetermined pressure, and gauge means for measuring the pressure in said unknown vessel when said second valve means is in said open condition, said pressure sensitive control means comprising pressure differential sensing means connected to said vessel and said source of predetermined pressure and generating a pneumatic signal when the pressure in said vessel rises to equal said predetermined pressure, and fluidic means responsive to said pneumatic signal to switch said first valve means to its shut condition and to switch said second valve means to its open condition.

2. A system as recited in claim 1, wherein said fluidic means comprises a fluidic flip-flop having a set condition and a reset condition and being reset in response to said pneumatic signal, means responsive to said fluidic flip-flop being in said set condition to set said first valve means in its open condition and said second valve means in its shut condition and responsive to said fluidic flip-flop being in said reset condition to set said first valve means in its shut condition and to set said second valve means in its open condition, and means for initially setting said fluidic flip-flop to be in said set condition.

* * * * *